United States Patent [19]

Pagis et al.

[11] Patent Number: 5,400,174

[45] Date of Patent: Mar. 21, 1995

[54] OPTICAL NOTCH OR MINUS FILTER

[75] Inventors: Alexander Pagis, Karmey Josef; Mordechai Gilo, Rehovot; Kopel Rabinovitch, Bney Brak, all of Israel

[73] Assignee: El-Op Electro-Optics Industries Ltd., Rehovot, Israel

[21] Appl. No.: 166,146

[22] Filed: Dec. 14, 1993

Related U.S. Application Data

[63] Continuation of Ser. No. 903,521, Jun. 24, 1992, abandoned.

[30] Foreign Application Priority Data

Jul. 2, 1991 [IL] Israel .......................................... 98713

[51] Int. Cl.$^6$ .............................................. G02B 5/28
[52] U.S. Cl. ..................................... 359/359; 359/586; 359/588; 359/589
[58] Field of Search .............. 359/580, 582, 584, 586, 359/588, 589, 359, 360

[56] References Cited

U.S. PATENT DOCUMENTS

| | | | |
|---|---|---|---|
| 2,890,624 | 6/1959 | Widdop et al. | 359/588 |
| 3,737,210 | 6/1973 | Howe | 359/588 |
| 4,770,496 | 9/1988 | Mahlein | 359/588 |
| 4,832,448 | 5/1989 | Jones . | |

FOREIGN PATENT DOCUMENTS

| | | | |
|---|---|---|---|
| 54-109855 | 8/1979 | Japan | 359/589 |
| 62-299905 | 12/1987 | Japan | 359/589 |
| 63-60402 | 3/1988 | Japan | 359/589 |

OTHER PUBLICATIONS

Alfred Thelen, "Design of Optical Minus Filters," *Journal of The Optical Society of America*, vol. 61, No. 3, Mar. 1971, pp. 365 to 369.

Primary Examiner—Martin Lerner
Attorney, Agent, or Firm—Jacobson, Price, Holman & Stern

[57] ABSTRACT

An interference filter, also referred to as a minus filter or a notch filter, of the type that reflects a narrow wavelength band while transmitting the wavelength bands from both sides of the spectrum. The filter can be designed for operation in any region from the ultraviolet to the visible through the infra-red regions of the spectrum. According to the invention, the thin film filter consists of uniform layer pairs of dielectric materials of different indices of refraction, deposited periodically on a light transmitting substrate. The overall optical thickness of each pair is one wavelength thick (at the notch wavelength). The two layers in a given pair have unequal thicknesses, each one close to half-wave at the notch wavelength. The technique of adjusting the layer thicknesses to non-normal angles of incidence is employed.

11 Claims, 5 Drawing Sheets

OPTICAL NOTCH OR MINUS FILTER

This application is a continuation of application Ser. No. 07/903,521, filed Jun. 24, 1992, now abandoned.

BACKGROUND OF THE INVENTION

Minus Filters or Notch Filters are by definition filters that eliminate a wavelength band from a spectrum, by reflection or absorption. The wavelengths that are eliminated are called the rejection band. The desired transmittance outside of the rejection band should be high. Conventional dielectric interference of the above type are generally comprised of a plane surface substrate, such as glass or germanium, upon which has been deposited by e.g. vacuum deposition a plurality of alternate high and low refractive index thin uniform layers where each layer has a quarterwave optical thickness of an odd multiple of a quarterwave, at the chosen wavelength which is required to be reflected. This multilayer system is known as a periodic multilayer system. Such systems exhibit a reflection zone centered at $\lambda o$, which is the design wavelength where the layers have an optical thickness of a quarter-wave.

The width of the rejection zone depends on the ratio between the refractive indices of the high and low index layers. The number of periods control the amount of rejection and the steepness of the edges of the zone. Obtaining a narrow rejection zone dictates the use of a multilayer consisting of two materials with a relatively small difference between their indices of refraction. There is an immense difficulty in finding such materials that are convenient and practical, especially in the infrared region, where only a limited number of materials are available.

However, there are several methods to produce these layers with small index difference. One method proposes using a material with an index of refraction that varies sinusoidally with the deposition parameters. When the variations are continuous the filter is called a Rugate Filter. Another method is the use of codeposition of the materials with gradual changes in concentration of the mixture resulting in gradient index. This technique was recently used to design and fabricate a single line and multiple line Rugate filters.

Another method uses Herpin Equivalent Layers, where one layer with a nonexisting index of refraction is fabricated from at least three real layers, to substitute one index with an index close to that of the other material. This method was applied in U.S. Pat. No.4,832,448. When applied for use in the visible region, it results in relatively much thinner layers than regularly used and requires the use of many periods and needs high accuracy of the layer monitoring.

It is the object of the present invention to provide a narrow-band notch filter in which these disadvantages are avoided.

SUMMARY OF THE INVENTION

The principle of the design technique used in accordance with the invention is to use the second harmonic of the conventional quarterwave filter. At the second harmonic, i.e. the wavelength where, each layer is exactly half wave optical thick, there is no rejection zone. These layers are known as absentee layers. The principle of the design technique is to change the half wave optical thickness of the two layers that constitute the fundamental pair in such a way that the total optical thickness of the pair will remain a full wave optical thickness. When this pair is used to construct a multilayer, a reflection zone appears at $\lambda o/2$. As the difference in optical thickness between the two layers is increased the spectral width of the reflection zone at $\lambda o/2$ grow. As the number of pairs is increased, the reflection at the center of the reflection zone is enhanced.

If a filter is required having a reflectance bandwidth of the order of 5% of $\lambda o/2$, the optical thickness of one of the layers in the pair is just less than a halfwave at $\lambda o/2$ and the optical thickness of the second layer is just more than a halfwave at $\lambda o/2$. To increase the peak reflectance of the reflection zone additional layer pairs are introduced until the desired value is obtained.

An integral part of this design technique is the existence of a reflectance zone at $\lambda o$. This is due to the first harmonic, where the optical thicknesses of the layers are close to quarterwave.

A potential application of this technique is in design of Head Up Displays (HUD) that reflect a narrow-band LED and/or CRT light source at a certain angle while transmitting the rest of the visible spectrum to the eyes of a pilot in a cockpit. Another potential application of this technique is in color contrast enhancement where there is a need to attenuate a certain color in transmission or in reflection. This is applicable to combiners and beamsplitters.

While this technique is discussed in relation to normal incident light, the technique can be applied to oblique angles of incidence, providing the layer thicknesses are adjusted to have the required optical thicknesses at the given angle of incidence, thicknesses that are referred to as "matched optical thicknesses".

The angular range of the reflection zone at a specified wavelength depends on the bandwidth of the zone. A very narrowband zone can provide a high reflection for only small changes in the angle of incidence around the center angle. Therefore, when applying this design technique for a range of incident ray angles, the bandwidth of the reflection zone should be enlarged to accommodate for all the required angles.

Thus, the invention provides the possibility of making an interference filter, such as a notch filter, which is effective in parts of the optical spectrum from the u.v. region to the far infrared region, where the reflection zone bandwidth is accomplished by the appropriate layer thicknesses. Thus the filter can be produced for use in regions where there are few materials for the traditional quarterwave design.

A crucial part in fabricating notch filters is in accurate control of the index of refraction and thickness of each layer during deposition. Inaccuracy in a layer will affect the steepness at the reflecting zone edges and the high transmittance outside the zone. The advantage of this invention is in layer thicknesses that are close to halfwave at $\lambda o$ and therefore are better suitable for accurate monitoring during the deposition and also for applying error compensation techniques during deposition.

Preferably, an anti-reflection (AR) layer or layers is added to the interference filter either between the layer pairs and the substrate or between the layer pairs and the incident medium. The AR may be fabricated from the same materials as the layer pairs or of other materials with different, indices of refraction.

BRIEF DESCRIPTION OF THE DRAWINGS

The invention is demonstrated by way of example only with reference to the following Examples, which are to be construed in an illustrative, non-limitative manner, and with reference to the enclosed Figures, in which.

DETAILED DESCRIPTION OF THE PREFERRED EMBODIMENTS

For a given band width, the number of layer pairs influences the degree of reflectance and also the steepness of the "flanks" of the curve. The larger (within reasonable limits) the number of layer pairs used, the higher the reflectance in the desired band width, and the steeper the curve boundering this region. Generally it is useful to use at least about eight layer pairs, for a reflectance of the order of about 70 to 80%, but up to at least 50 pairs may be used. Any suitable pair of substances can be used, but practically the number of substances which can be conveniently handled and which have the required physical properties is not too large. It is of course necessary to resort to substance pairs which have a suitable difference of index of refraction.

A variety of substances can be used. Generally these will be oxides, sulfides, fluorides etc., which are transparent at the required wavelengths for the relevant spectral range.

The layers are deposited generally by evaporation, using well known controlled processes. The layers are deposited onto a suitable substrate, which is a rigid material, transparent in the required spectral region.

When pairs of substances are used which have a small difference in their indices of refraction, a notch filter can be produced which has a high reflectance and a narrow reflectance band. It is possible to produce filters which have more than one reflectance zone; the others being harmonics of the first.

EXAMPLE 1

Production of multilayer TiO$_2$/SiO$_2$ Notch Filter

Figure 1:
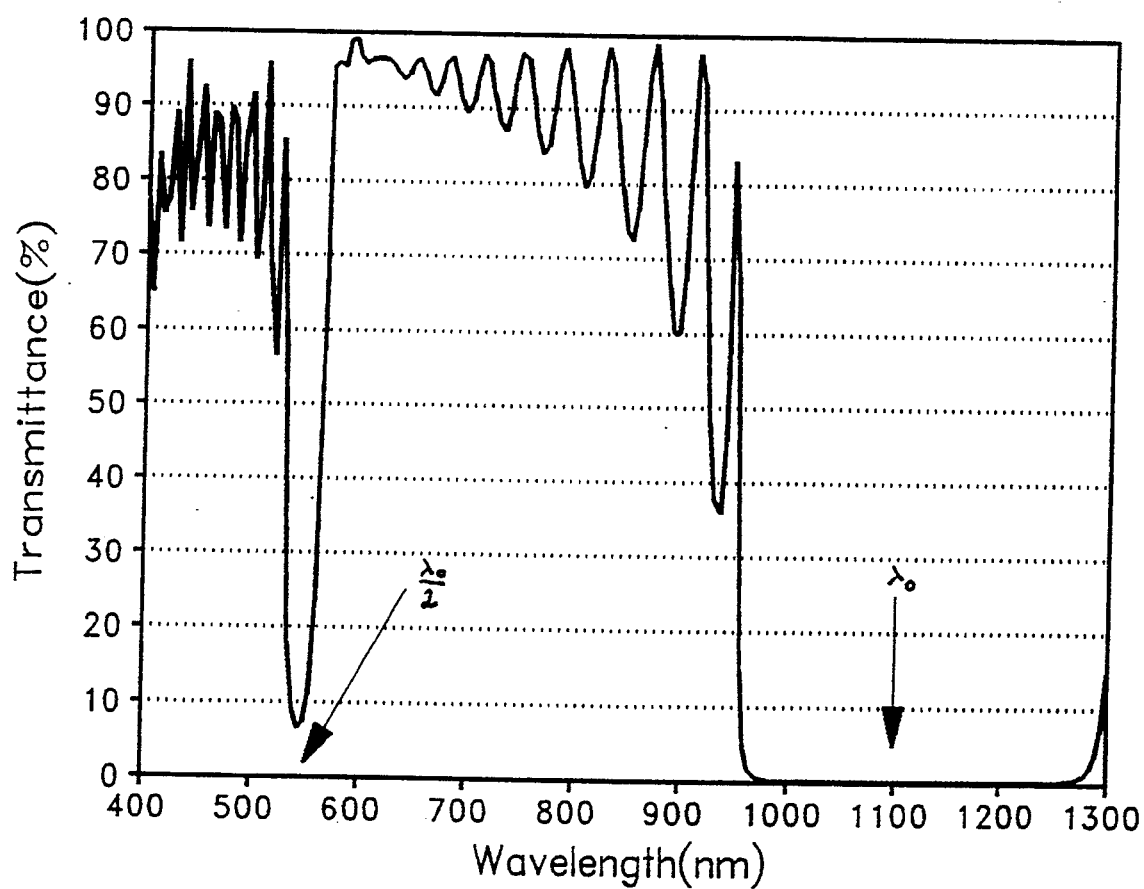
FIG. 1 illustrates a transmittance versus wavelength curve of a filter of the invention having 12 pairs of TiO$_2$ and SiO$_2$, on a glass substrate.

A multi-layer notch filter, having the characteristics set out in FIG. I, was produced, having the following layer (material) sequence:

Air / 1.1H, (0.9, 1.1H)×12 /Glass Surface where the high refractive index, $n_H=2.3$ and the low refractive index, $n_L=1.45$ and where the indices of air and glass are assumed to be 1 and 1.52 respectively and where 1 H and 1 L represent, respectively, layers having the thickness of a quarter wavelength, calculated on the reference wave-length $\lambda_o=1.100$ nm, of titanium dioxide and silicon dioxide, respectively. Thus, the first layer facing the air is a TiO$_2$, which has the physical thickness of $$\frac{1.1 \times 1,100}{4 \times 2.3} = 131.5 \text{ nm}$$

where the refractive index of TiO$_2$ is 2,3. The term "×12" indicates a twelve-pair stack; i.e. a stack of 24 layers, where each of these is as indicated above, FIG. 1 represents the spectral characteristics of such a filter. This demonstrates the presence of a sharp dip or notch in the transmission of the filter around the 550 nm region. In this region the filter effectively reflects most of the incident light and attains the desired narrow band reflection. The illustrated filter has an effective reflection efficiency better than 90 per cent, within a narrow band width, of Less than about 3 % of the reference wavelength of 11 00 nm. When a filter is constructed of a larger number of layer-pairs, the peak reflectivity is further increased, and also the steepness of the edges adjacent the reflective band is increased.

The bandwidth can be increased or decreased at will by adjustment of the thickness of tile layers and by changing the thickness ratio between the h and the L layers.

EXAMPLE 2

TiO$_2$/SiO2 Notch Filter

Figure 2:
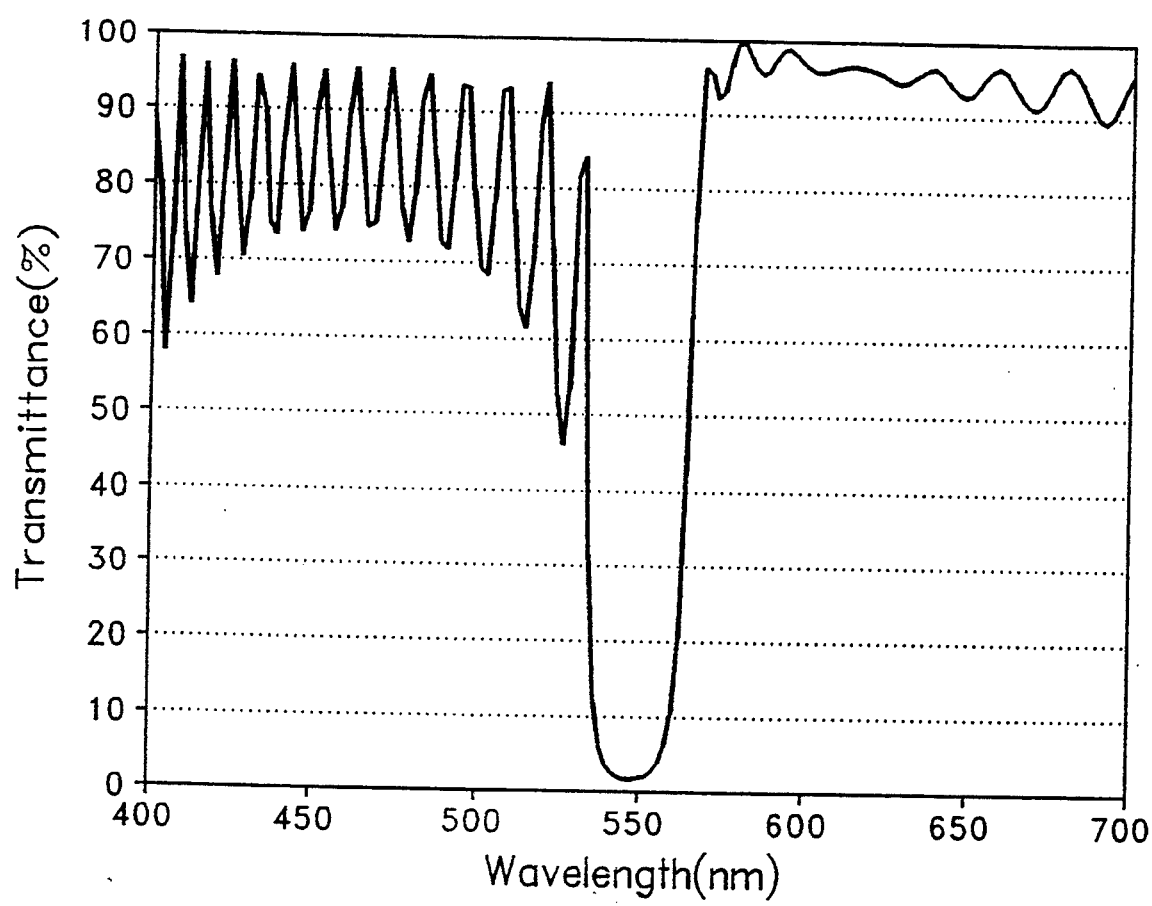
FIG. 2 is a similar curve for a filter of 17 layer pairs of TiO$_2$ and SiO$_2$, on a glass substrate.

A filter having the following layer sequence was produced:

Air/1.1H. (0.9L, 1.1H)×17 Glass substrate with $\lambda_O=1100$ nm and where $n_H=2.3$ and $n_L=1.45$, the indices of air and glass assumed to be 1 and 1.52 respectively H and L representing, respectively, quarter-wavelength layers at a reference wavelength of 1,000 nm. Thus this filter comprises 35 layers, resulting in a transmittance in the rejection zone, as shown in FIG. 2:, which is lower than that of Example 1.

EXAMPLE 3

TiO$_2$ Notch Filter

Figure 3:
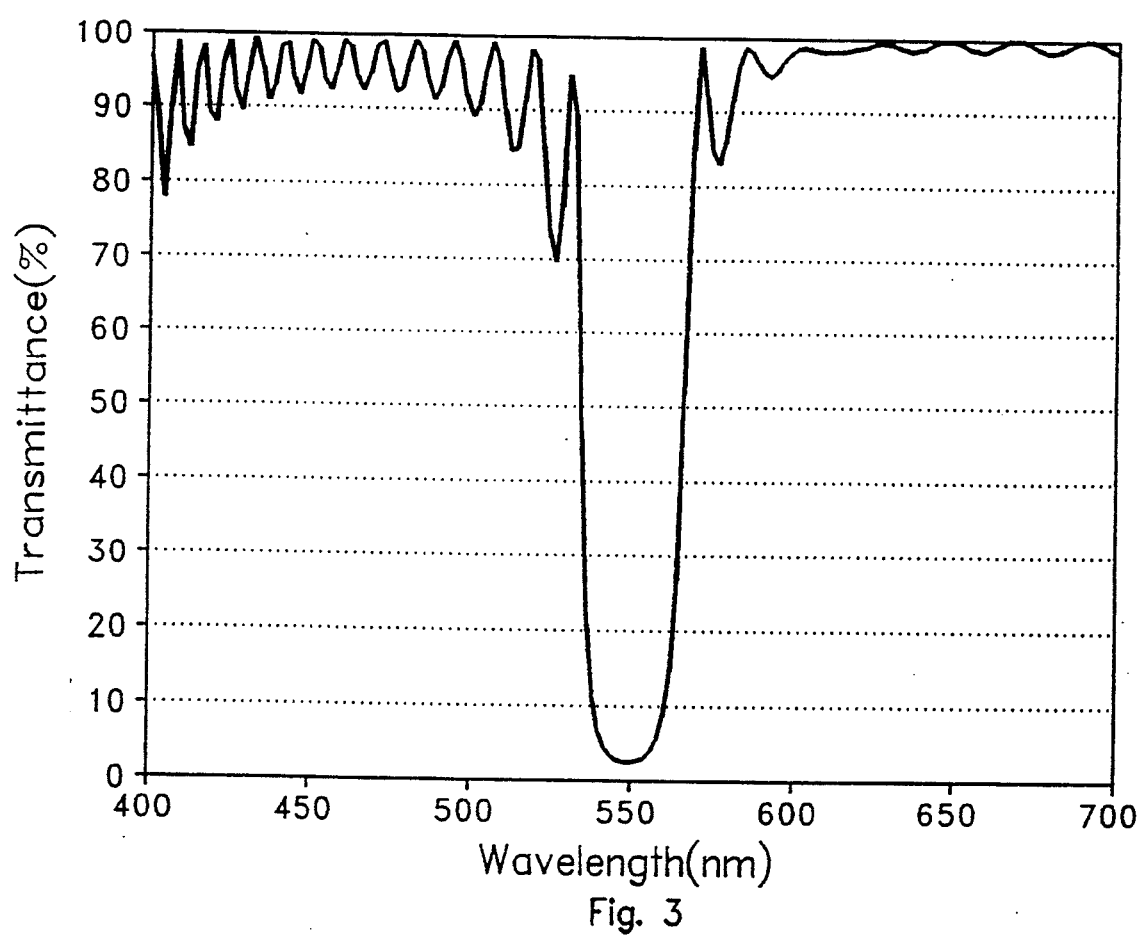
FIG. 3 is a similar curve for a filter comprising 17 layer pairs of TiO$_2$ and SiO$_2$, on a glass substrate with enhanced transmission, in the transmission bands

A notch filter was produced similar to that of Example 1, based on the same substance (TiO$_2$ and SiO$_2$), having the following layer sequence:

Air/0.5M, 1.1H, (0.9L, 1.1H)×17/Glass substrate with a reference wavelength of $\lambda_O=1,100$ nm, and with $n_H=2.3$ $n_L=1.45$, and $n_M=1.38$, the indices of air and glass assumed to be 1 and 1.52 respectively where H L and H represent respectively, quarter wave-length thickness layers, calculated at the reference wavelength of 1,100 nm, of TiO$_2$ and SiO$_2$ and M$_g$F$_2$ respectively. The filter comprises an additional layer at the air boundary, resulting in an enhanced transmittance in the transmitting zones, as illustrated in FIG. 3. This layer serves an anti-reflection (AR) layer, effective for this spectral region. Spectral transmittance of this configuration as shown in FIG. 3.

EXAMPLE 4

Notch Filter for Non-Normal Incidence

Figure 4:
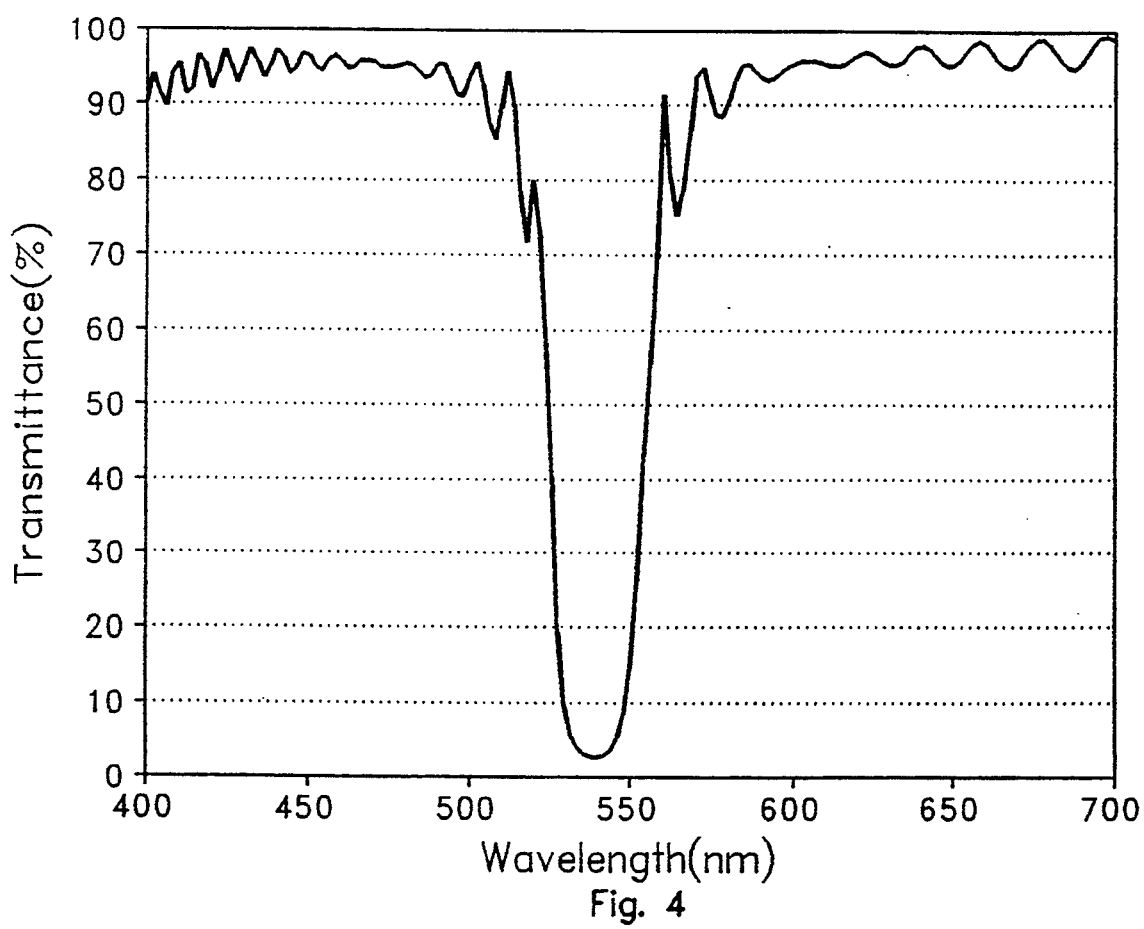
FIG. 4 is a similar curve for a filter comprising 21 layer pairs of TiO$_2$ and SiO$_2$, on a glass substrate optimized for viewing at an angle of incidence of 52$^O$

A notch filter was produced, having the following sequence of layers:

Air 0.53L, 1.171 H, (1.072 L, 1.171 H)×19/glass substrate reference wavelength of $\lambda_O=1080$ nm. Thus, this filter comprises a total of 40 layers, in 20 layer pairs, and a further single layer $n_H=2.3$ and where $n_L=1.45$. The filter is viewed at an angle of 52° with the desired characteristic that it reflects a CRT or phosphor which emits a narrow band at about 541 nm, and which has a high photo-pic transmittance of the transmitted spectrum. Spectral transmittance is shown in FIG. 4.

EXAMPLE 5

Notch Filter for IR use

A notch filter was produced having the following layer sequence:

Air/0.5L, (1 .1H, 0.9L)×12/Germanium substrate for a reference wavelength of $\lambda_o=20$ μ, where $n_H=4$ and where $n_L=2.15$.

The indices of air and germanium are assumed to be 1 and 4, respectively.

Figure 5:
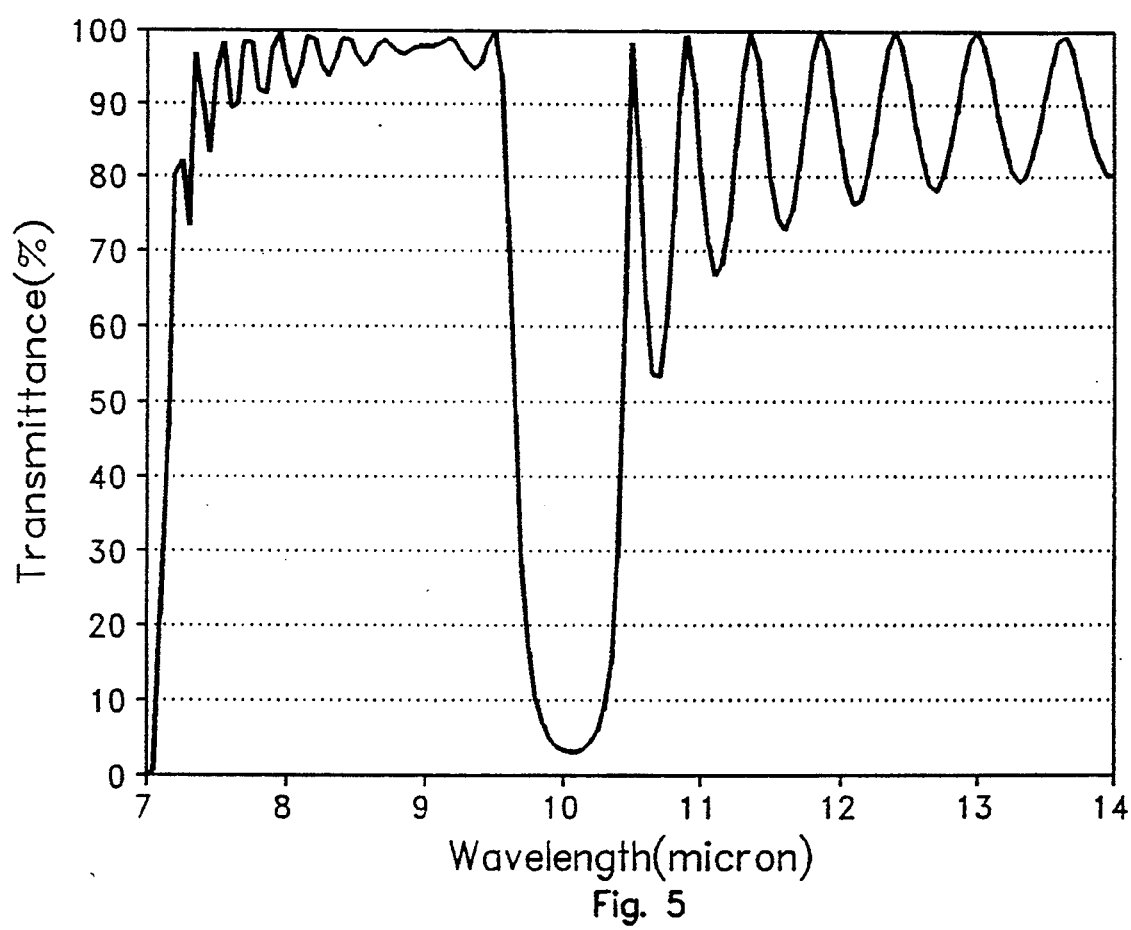
FIG. 5 is a similar curve for a filter comprising 12 layer pairs of germanium and ZnS on a Germanium substrate.

In this filter H and L represent, respectively, quarter-wavelength thickness layers at a reference wavelength of 20 μ of Germanium and Zinc sulfide, resulting in a narrow-band reflectance zone at 10 μ. Spectral transmittance of this configuration is shown in FIG. 5.

The width and abruptness of the rejection band of filters of the invention is clearly demonstrated in the figures.

For example, and referring to FIGS. 2 and 3, at the representative value of 50% transmittance, the center of the band is 550 nm. Its width at this point is, in FIG. 2, measured on the X scale, about 30 nm. FIG. 5 illustrates the shape of the rejection (reflection) band about 10 microns, for a design wavelength of 20 microns. Measurement of the width of this band at 50% transmittance shows that the width of the band at this point is about 0.75 microns, and the shape of the band is indicative of the high efficiency of such a filter. At 100% transmittance, the value is about 1 micron.

As stated in Example 1, the filter has an effective reflection efficiency better than 90%, with a narrow band width, of less than about 3% of the reference wavelength (design wavelength) of 1100 nm. Thus, such 3% define a width of about 33 nm.

We claim:

1. An optical notch filter which rejects by reflection a narrow wavelength rejection band around a wavelength of 550 nanometers, said narrow wavelength rejection band having a band width of 15 to 45 nanometers defined by points on both sides of the rejection band of 50 percent transmittance, which narrow wavelength rejection band is flanked at both its sides by regions of high transmittance, said optical filter comprising twelve to fifty pairs of optical layers, where in each pair of layers one layer is $TiO_2$ which has an index of refraction of 2.25–2.3 and the other layer is comprised of a material having a lower index of refraction, wherein the optical thickness of each pair of layers equals a full wave effective optical thickness at 550 nanometers and wherein the ratio of the optical thickness of said layer of $TiO_2$ to the optical thickness of the layer of the lower index of refraction is 1.1–1.35.

2. A filter as claimed in claim 1, where in order to enhance transmission on at least one side of the rejection zone, there is provided one or more antireflection layers on either side of the stack of layer pairs.

3. A notch filter according to claim 2 where the anti-reflection layer consists of a material different from that of the layer pairs, or where the layer consists of the material of one of the materials of such layers, but is of a different thickness.

4. A notch filter according to claim 3, where the thickness of the anti-reflection layer varies between about 0.16 μ and between 40 μ.

5. A filter according to claim 1 where for oblique angles of incidence, the thickness or each individual layer of the pairs is adjusted accordingly.

6. A filter according to claim 1 having more than one band of rejection.

7. A filter according to claim 1, wherein said material having a lower index of refraction is $SiO_2$ which has an index of refraction of 1.44 to 1.46.

8. The filter according to claim 1 wherein said optical filter comprises twelve to twenty-one pairs of optical layers.

9. An IR optical notch filter, which rejects by reflection a narrow wavelength rejection band around a wavelength of 10 μ, said narrow wavelength rejection band having a bandwidth of 0.5 to 1.5 microns defined by the two closest points of 50 percent transmittance on both sides of the rejected band, said narrow wavelength rejection band being flanked at both of its sides by regions of high transmittance, said filter comprising twelve to fifty pairs of optical layers, where in each pair of layers one layer is Ge which has a high index of refraction of approximately 4.0 and the other layer is comprised of a material having a lower index of refraction, wherein the optical thickness of each pair of layers equals a full wave effective optical thickness at 10μ and wherein the ratio of the optical thickness of said layer of Ge to the optical thickness of the layer having the lower index of refraction is 1.1–1.35.

10. A filter according to claim 9, wherein said material having a lower index of refraction is ZnS which has an index of refraction of approximately 2.15.

11. The filter according to claim 9 wherein said filter comprises twelve to twenty-one pairs of optical layers.

* * * * *